UNITED STATES PATENT OFFICE.

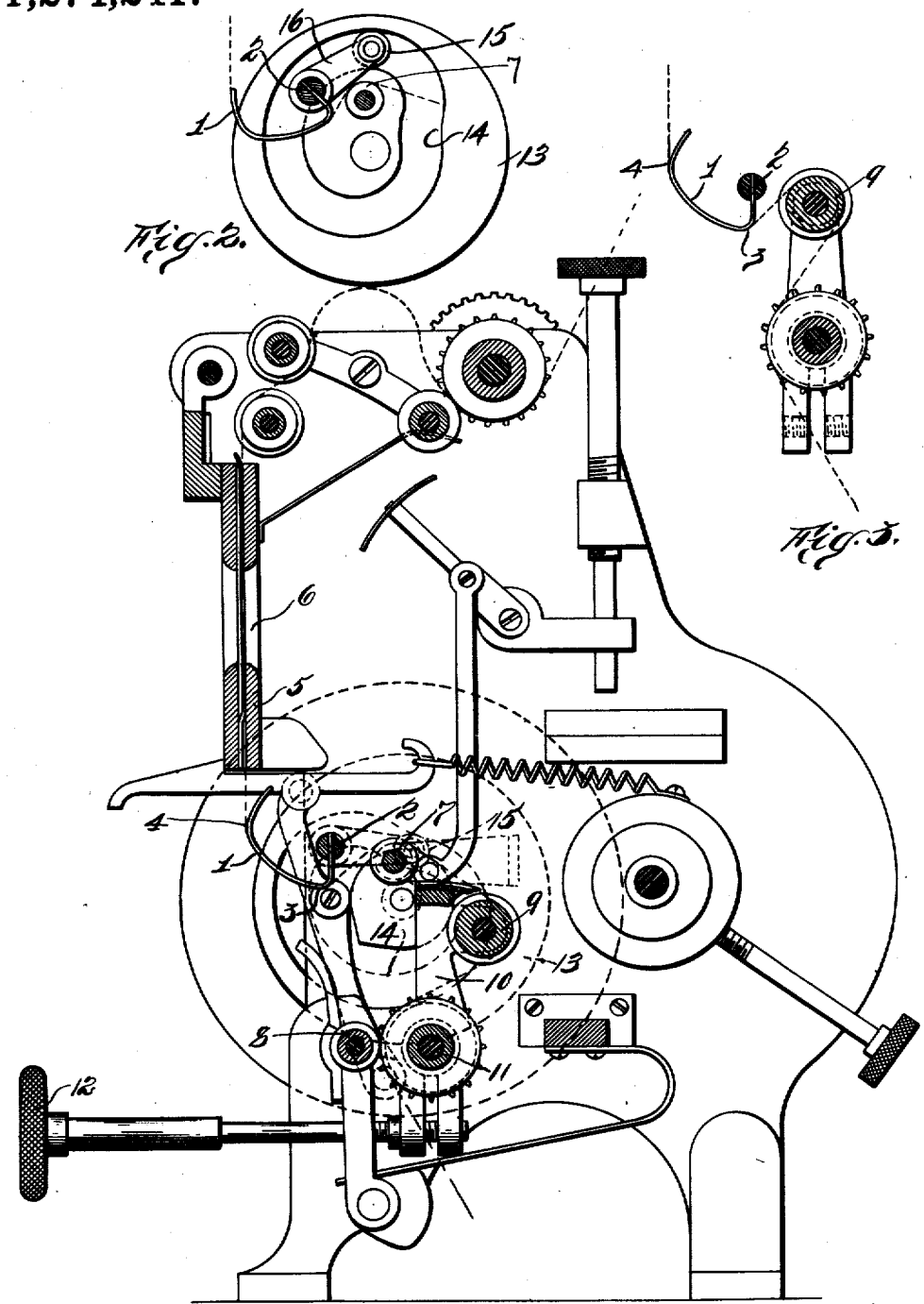

JAMES A. CAMERON, OF BROOKLYN, NEW YORK.

MOVING-PICTURE MACHINE.

1,274,241.   Specification of Letters Patent.   Patented July 30, 1918.

Application filed May 3, 1911, Serial No. 624,818.   Renewed December 17, 1917.   Serial No. 207,626.

*To all whom it may concern:*

Be it known that I, JAMES A. CAMERON, a citizen of the United States, and a resident of the borough of Brooklyn, in the county of Kings, city and State of New York, have invented certain new and useful Improvements in Moving-Picture Machines, of which the following is a specification.

My present invention relates particularly to the means for intermittently advancing the film past the exposure opening, and the object of the invention is to improve this means and to simplify it as much as possible.

The film advancing means of the present invention is of the "beater" type, and consists of a member which is oscillated to engage with the film to intermittently advance the same, picture-by-picture, past the exposure opening. The principal feature of the invention resides in providing this oscillating member or beater, with an elbow or angular projection, disposed near to the point of pivotal support of the beater. This so-called "elbow" forms an additional film engaging portion and sweeps the film sidewise while the outer film engaging portion of the beater is acting to draw the film downward. The elbow thus assists the outer active end of the beater in advancing the film. By reason of this compound action the beater will act much faster and the stroke of the beater may be made less than where, as is ordinarily the case, only the free outer end of the beater is instrumental in advancing the film.

Various other objects and features of my invention will appear as the specification proceeds.

In the accompanying drawing I have illustrated several preferred embodiments of my invention but I would have it understood that various changes and modifications may be made therein without departing from the spirit and scope of the invention. Also, while for purposes of illustration, the invention is disclosed as applied to a projector for exhibiting pictures, I would have it known that it may also be adapted to a camera for taking the pictures.

In the drawing:

Figure 1 is a side elevation of a moving picture machine embodying my invention.

Fig. 2 is a detached view of the film advancing means and the cam for operating the same, the beater in this instance being shown in a different position.

Fig. 3 is a detail view of a slight modification of the invention.

Like reference characters have been used to designate like parts throughout the several views.

According to the preferred embodiment herein illustrated, the beater or film advancing member 1 is supported at one end on a pivot 2 preferably in the form of a rock-shaft, as shown, and intermediate its ends and comparatively close to the point of pivotal support, the beater is formed with an angular projection or elbow 3. This elbow forms a second film engaging portion in addition to the active film engaging portion 4 of the outer free end of the beater. The active film engaging portion of the beater thus extends from a point (the elbow 3) which is eccentric with respect to the pivotal support, laterally away from the support. In practice the beater may be made of flat relatively stiff material which is first directed downwardly a short distance from the point of its attachment to the pivot and thence directed laterally or tangentially away from the pivot in the form of a more or less gradual curve.

The beater is disposed below and to one side of the film support comprising a face plate 5 and the gate 5' which may have the exposure opening 6 therein, and to the rear of the beater there is arranged a film guide 7. These members 5 and 5' of the support form a suitable retarding device which may exert a continuous tension on the film or may exert an intermittent pressure or tension on the film which aids in the framing of the picture with respect to the exposure opening. The beater thus acts against the upper face of the film extending between the lower end of the film support and the film guide 7. As this surface of the film is usually the smooth or non-sensitized face, the action of the beater will have no injurious effect upon the film.

A guide roll or like device may be used for the film guide 7. In Fig. 1 this guide is shown in the form of an independently supported roll and it will be noted that this film guide is disposed both in rear of and above the lowest point of the elbow in the beater. The reason for placing this film guide above the lowest portion of the angular projection or bend in the beater, is to provide an upwardly extending strip of film in rear of the beater on which the elbow or angular projection may act.

Below the means for intermittently advancing the film there is provided some means for holding the advanced portion of the film to prevent retrograde movement of the same. This last-named means may be in the form of a constantly rotating take-up device 8 substantially as illustrated. For the purpose of framing the pictures with respect to the exposure opening, a framing device may be interposed between the film advancing means and the take-up device. This framing means is shown in the form of a roll 9 which presses against the strip of film between the film advancing means and take-up device, the roll being carried by a lever 10 which is rotatably adjustable about the center 11 of the take-up roll. This framing roll may be clamped in adjusted position by means of a thumb screw 12.

In the modification illustrated in Fig. 3, the framing roll 9 performs the double function of the framing device and the film guide (7 in Fig. 1) which is located in rear of and above the angular projection of the beater.

The means for operating the beater may vary but in the present instance this means is shown in the form of a cam 13 having a cam groove 14 with which is engaged a cam roll 15 on the end of the rock-arm 16 fixed to the rockshaft 2 which carries the beater. This cam is preferably so shaped as to give the beater a quick downward film advancing movement and a comparatively slow upward return stroke.

The operation of my improved film advancing means will be clear from a consideration of Fig. 1, and there it will be seen that upon the downward movement of the beater, the outer film engaging portion 4 of the beater will serve to draw the film directly downward, while the elbow portion 3 of the beater will act on the strip of film between the lower end of the film support 5 and the film guide 7 to carry the film in a sidewise direction away from the plane of the film support 5. This double or compound motion renders the beater very quick in its action so that only a comparatively short stroke is necessary.

The principle of this invention is the same as that disclosed in my Patent No. 1,020,383, in which the beater is constructed so as to be inherently capable of advancing more film each time than is actually needed. This, as clearly pointed out in the patent aforesaid, causes a certain compensation to take place whereby inequalities in the film will be absolutely compensated for, so that an equal amount of film will be advanced each time.

But in the prior patent the beater or film advancing member engaged both faces of the film, while in the present case the beater engages only with the one face of the film (usually the non-sensitized) and, as in the prior case, the beater here also has a stroke greater than is really needed—that is, inherently capable of advancing more than a picture length of film. This, in combination with the fact that the take-up device winds in the film at a definite fixed rate, and that a film retarding device acts on the film to hold back the film until all wrinkles and irregularities have been pulled out of it, permits of any wrinkles or irregularities in the film being compensated for, so that an exact picture-length of film will be advanced each time.

The cam (or other actuating device, as the case may be) is preferably arranged substantially as shown, so as to give the film advancing member or beater, a quick downward or active stroke and a relatively slow upward or idle stroke.

What is claimed is:

1. In a moving picture machine, an oscillatory film advancing member pivotally supported at one end, said member having an angular projection therein near the point of pivotal support, and a film guide disposed in rear of the angular projection in the film advancing member.

2. In a moving picture machine, an oscillatory film advancing member pivotally supported at one end, said member having an angular projection therein near the point of pivotal support, and a film guide disposed in rear of the angular projection in the film advancing member at a point higher than the lowest part of the angular projection.

3. In a moving picture machine, film advancing means comprising a pivot, a member carried by said pivot, adapted to engage with the film, the said member having a part extending downward from the pivot and thence laterally away from the pivot, and means for oscillating the pivot and the member carried thereby.

4. In a moving picture machine, film advancing means comprising a pivot, a member carried by said pivot, embodying a portion extending downward from the pivot a short distance and thence laterally away from the pivot a greater distance, and means for oscillating the pivot and the member carried thereby.

5. In a moving picture machine, film advancing means comprising a pivot, a member connected at one end to said pivot extending downward from the point of connection with the pivot, a laterally directed portion extending tangentially from the downwardly directed portion, and means for oscillating the pivot and the member carried thereby.

6. In a moving picture machine, a film support provided with an exposure opening therein, a film advancing member pivotally supported below and to one side of the film support, said film advancing member having a downwardly extending portion extending downward from the point of pivotal support, and a laterally directed portion carried by the downwardly extending portion and extending toward the film support.

7. Film advancing means consisting of an oscillating film advancing member having an angularly extending film engaging portion disposed between the ends of said member, means for oscillating the film advancing member, and a film guide disposed in rear of and higher than the angularly extending portion of the film advancing member.

8. Film advancing means consisting of a pivot, a film advancing member secured at one end to said pivot, said member having an angular bend therein disposed between the ends of the member and relatively close to the pivot, means for oscillating the pivot and the member carried thereby, and a film guide located in rear of and higher than the angular bend in the film advancing member.

9. An oscillating film advancing member pivotally supported at one end, means for oscillating said member, the said member having a film engaging portion at the free end thereof and an angular bend forming a second film engaging portion located near the pivotal support of the member.

10. An oscillating film advancing member pivotally supported at one end, the said member having a film engaging portion at the free end thereof, an angular bend forming a second film engaging portion located near the pivotal support of the member, means for oscillating the member about the pivotal support, and a film guide located in rear of and above the angular bend aforesaid, and means for oscillating the film advancing member.

11. In a moving picture machine, a film support having an exposure opening therein, film advancing means comprising a member pivotally supported at one end and located below and to one side of the film support, means for oscillating said member about the pivotal center, a film guide located in rear of the film advancing member, the said member adapted to engage the stretch of film between the lower end of the film support and the film guide, and the said member having a film engaging portion at its outer free end to act on the film and draw the same downward, and an angular bend near its inner end to act on the film and draw the same inward away from the film support.

12. In a moving picture machine, a film support having an exposure opening therein, a film guide below the exposure opening, an oscillatory film advancing member engaging the film between the lower end of the film support and the film guide, the said member having an outer film engaging portion substantially in line with the film support and an angularly directed film engaging portion forming a continuation of the outer film engaging portion and located relatively near the pivotal support of the member.

13. In a moving picture machine, a film support having an exposure opening therein, a film guide below the exposure opening, an oscillatory film advancing member engaging the film between the lower end of the film support and the film guide, the said member having an outer film engaging portion substantially in line with the film support and an angularly directed film engaging portion forming a continuation of the outer film engaging portion and located relatively near the pivotal support of the member, means for oscillating the film advancing member and a take up device for holding the film in advance of the film advancing member.

14. Film advancing means for moving picture machines comprising a member pivotally supported at one end and adapted to engage one side of a stretch of film supported between two points, the said member having an outer film engaging portion at the free end thereof and an angular elbow forming a film engaging portion near the inner end thereof, and means for oscillating the member about the center of pivotal support.

15. Film advancing means for moving picture machines comprising a member pivotally supported at one end and adapted to engage one side of a stretch of film supported between two points, the said member having an outer film engaging portion at the free end thereof and an angular elbow forming a film engaging portion near the inner end thereof, means for oscillating the member about the center of pivotal support, a film guide located in rear of and above the angular elbow portion of the film advancing member, and a take up device for holding the film in advance of the film advancing member.

16. Film advancing means comprising a rock shaft, a rock arm on one end of said shaft, a cam roll carried by said rock arm, a cam engaging said roll for oscillating the rock shaft, and film engaging means carried by said rock shaft, embodying a member having its one end secured to the rock shaft and provided with an angular bend therein disposed relatively close to the point of connection with the rock shaft.

17. Film advancing means comprising a rock shaft, a rock arm on one end of said shaft, a cam roll carried by said rock arm, a cam engaging said roll for oscillating the rock shaft, film engaging means carried by said rock shaft, embodying a member having its one end secured to the rock shaft and provided with an angular bend therein disposed relatively close to the point of connection with the rock shaft, a film guide located in rear of and above the angular bend in the member aforesaid, and a take up device for holding the film in advance of the film advancing means.

18. Film advancing means for moving picture machines, comprising a member pivotally supported at one end and adapted to engage one side of a stretch of film supported between two points, the said member having an outer film engaging portion at the free end thereof and an angular elbow forming a film engaging portion near the inner end thereof, and means for oscillating the member about the center of pivotal support, the said member having an active stroke inherently greater than the actual amount of film to be advanced.

19. The combination in a moving picture machine, of a device adapted to take up a definite amount of film during each cycle of the machine, an oscillating film advancing member pivotally supported at one end and engaging only with one face of the film, said member having a movement in one direction potentially sufficient to advance a greater amount of film than that taken up by the take-up device during the same cycle of the machine and means for oscillating the film advancing member.

20. The combination in a moving picture machine, of a constantly acting device adapted to take up a definite amount of film during each cycle of the machine, an oscillating film advancing member pivotally supported at one end and engaging only with one face of the film, and means for oscillating said member with a movement in one direction potentially sufficient to advance a greater amount of film than that taken up by the take-up device during the same cycle of the machine.

21. In a moving picture machine provided with an exposure opening, means for intermittently advancing the film past said exposure opening comprising a take-up device and a pivoted beater located between the take-up device and the exposure opening, the said beater having an active film engaging portion extending from a point eccentric with respect to the pivotal support of the beater laterally away from such pivotal support, and means for oscillating the beater about its pivotal support.

Signed at New York city, in the county of New York and State of New York, this 29th day of April, A. D. 1911.

JAMES A. CAMERON.

Witnesses:
PHILIP S. McLEAN,
AXEL V. BEEKEN.

It is hereby certified that in Letters Patent No. 1,274,241, granted July 30, 1918, upon the application of James A. Cameron, of Brooklyn, New York, for an improvement in "Moving-Picture Machines," errors appear in the printed specification requiring correction as follows: Page 3, lines 44-45, strike out the comma and the words "and means for oscillating the film advancing member"; same page, line 74, claim 12, strike out the period and insert a comma and the words *and means for oscillating the film advancing member.;* and that the said Letters Patent should be read with these corrections therein that the same may conform to the record of the case in the Patent Office.

Signed and sealed this 29th day of October, A. D., 1918.

[SEAL.]

R. F. WHITEHEAD,

*Acting Commissioner of Patents.*

Cl. 88--18.6.